United States Patent
Sunkara et al.

(10) Patent No.: US 12,182,498 B1
(45) Date of Patent: Dec. 31, 2024

(54) REDACTING PORTIONS OF TEXT TRANSCRIPTIONS GENERATED FROM INVERSE TEXT NORMALIZATION

(71) Applicant: Amazon Technologies, Inc., Seattle, WA (US)

(72) Inventors: Monica Lakshmi Sunkara, San Jose, CA (US); Deepthi Devaiah Devanira, Seattle, WA (US); Chaitanya Shivade, Santa Clara, CA (US); Sravan Babu Bodapati, Redmond, WA (US); Katrin Kirchhoff, Seattle, WA (US); Srikanth Ronanki, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 17/810,302

(22) Filed: Jun. 30, 2022

(51) Int. Cl.
*G06F 40/166* (2020.01)
*G06F 21/62* (2013.01)
*G06F 40/279* (2020.01)
*G10L 15/16* (2006.01)
*G10L 15/22* (2006.01)

(52) U.S. Cl.
CPC .......... *G06F 40/166* (2020.01); *G06F 40/279* (2020.01); *G10L 15/16* (2013.01); *G10L 15/22* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 8,938,386 B2 | 1/2015 | Cumby et al. | |
| 10,089,287 B2 | 10/2018 | Rebstock et al. | |
| 11,302,314 B1* | 4/2022 | Jawale | G06N 3/08 |
| 11,947,872 B1* | 4/2024 | Mahler-Haug | G10L 15/04 |
| 2013/0096911 A1* | 4/2013 | Beaufort | G06F 40/40 704/9 |
| 2021/0125615 A1* | 4/2021 | Medalion | G06N 3/044 |
| 2021/0256160 A1 | 8/2021 | Hachey | |
| 2021/0303778 A1 | 9/2021 | Schrichte | |
| 2022/0292218 A1* | 9/2022 | Zarecki | G06F 18/22 |
| 2023/0352009 A1* | 11/2023 | Behre | G06F 40/279 |

OTHER PUBLICATIONS

Monica Sunkara, Chaitanya Shivade, Sravan Bodapati, Katrin Kirchhoff, "Neural Inverse Text Normalization," available at https://arxiv.org/abs/2102.06380, 2021, pp. 1-5.

* cited by examiner

*Primary Examiner* — Stella L. Woo
(74) *Attorney, Agent, or Firm* — S. Scott Foster; Kowert, Hood, Munyon, Rankin & Goetzel, P.C.

(57) ABSTRACT

Portions of text data generated from inverse text normalization may be redacted. Text data for redaction may be obtained. One or more inverse text normalization models may be applied to the text data to generate normalized text data. A machine learning model, trained to recognize text for redaction, may be applied to identify portions of the normalized text data for redaction. The identified portions may be redacted and the redacted normalized text provided to a destination.

20 Claims, 7 Drawing Sheets

REDACTING PORTIONS OF TEXT TRANSCRIPTIONS GENERATED FROM INVERSE TEXT NORMALIZATION

BACKGROUND

Various different scenarios call for the use sophisticated automated speech recognition (ASR) algorithms to be employed for processing speech data. For example, transcription systems may have to capture different types of voices or perform speech recognition across a wide variety of subject matters and generate a transcription of text in captured speech audio. Given the wide variety of subject matters, scenarios may also occur in which these transcription systems may be used for handling different speech content subject to different handling requirements.

Figure 1:
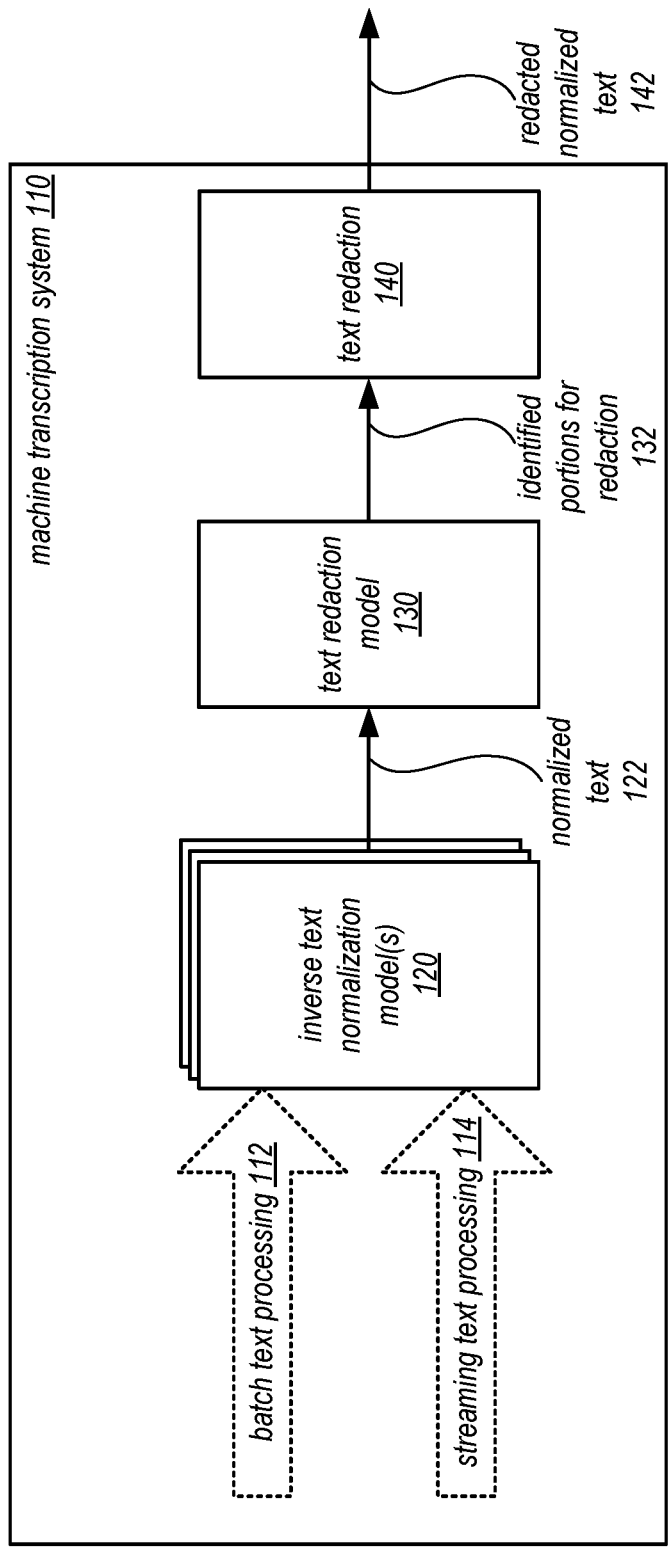
FIG. 1 illustrates a logical block diagram of redacting portions of text transcriptions generated from inverse text normalization, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for redacting portions of text transcriptions generated from inverse text normalization are described herein. Machine transcription techniques allow for data captured from various sources, such as audio data, to be used to generate a text representation of speech in the audio data as a transcript which may include one or multiple speakers. Because transcription services may cover speech in many different subject areas, there may be some subjects which may include discussion of subject matter that may not need to be transcribed or may need not to be transcribed for various regulatory, privacy, or security concerns. Therefore, in various embodiments techniques for including redaction of text in machine transcription may be performed.

In machine transcription services, the accuracy and performance of various features like redaction may happen in programmatic or automated scenarios where erroneous redaction decisions can cause mistakes in subsequent processing, data loss, or misrepresentations of the source speech. Therefore, techniques that improve the performance of redaction techniques in machine transcription systems are highly desirable. As discussed in detail below, text transcriptions may include inverse normalization models that are applied as part of inverse normalization techniques which may be used to convert speech to written text. The normalized text data may provide a more accurate set of data for searching for text portions to redact than would otherwise be obtained without inverse normalization. Thus, redacting portions of text transcriptions generated from inverse text normalization improves the performance of redaction and the performance of subsequent systems or applications that rely upon the accuracy of the provided redacted and normalized text to perform various other operations.

FIG. 1 illustrates a logical block diagram of redacting portions of text transcriptions generated from inverse text normalization, according to some embodiments. Machine transcription system 110 may be a standalone machine transcription system, service, or application, or may be one of many different services offered as part of a provider network, as discussed in detail below with regard to FIG. 2. Machine transcription system 110 may support receiving audio data or other data for machine transcription (e.g., video data) from various sources. In some embodiments, the received data may be in a batch, such as batch of one or more audio files that are access and have automatic speech recognition (ASR) performed upon them. Then, this batch text may be provided for further processing, as indicated at 112. Similarly, streaming text processing 114 may be performed for real-time transcriptions (e.g., for displaying transcription results in various scenarios). An audio stream may be provided to an ASR system (not illustrated) which may generate the corresponding text data as a stream of text data.

Whether provided as a stream of text data or as a batch, machine transcription system 110 may implement one (or more) inverse text normalization model(s) 120 for handling the text data. For example, a neural network-based model inverse normalization model, finite state transducer model, or a combination of multiple models may be applied to generate normalized text 122. In some embodiments, dynamic context decisions as to how many words from a stream of input text data to consider for normalization and text redaction may be made using a scout network, as discussed in detail below with regard to FIG. 5. In some embodiments, the output of one model (e.g., a neural network-based inverse text normalization model may be evaluated and if of a high enough confidence used in combination with an FST, instead of an FST alone).

Normalized text 122 may be evaluated using a text redaction model 130. Text redaction model 130 may be a machine learning model trained to classify one or more portions of normalized text as a redacted class. The redacted classes, such as personally identifying information (PII), financial information, legally protected information, or various other information for which redaction is desirable may be trained and detected by text redaction model. Text redaction model 130 may then provide the identified portions for redaction, as indicated at 132 to text redaction 140. Text redaction 140 may then determine whether the identified portions should be redacted (e.g., based on confidence scores of the redaction classifications). For those redactions that should be performed, text redaction 140 may modify the normalized text to remove, replace, obscure, or otherwise make unavailable the text portions (one or more words) to redacted, in some embodiments. Then, redacted normalized text 142 may be provided for various other downstream processes, operations, storage, or other uses.

Please note that the previous description of redacting portions of text transcriptions generated from inverse text normalization is a logical illustration and thus is not to be construed as limiting as to the implementation of a machine transcription system, or various other illustrated features.

This specification continues with a general description of a provider network that implements multiple different services, including a machine transcription service, which may implement redacting portions of text transcriptions generated from inverse text normalization. Then various examples of, including different components/modules, or arrangements of components/module that may be employed as part of implementing the services are discussed. A number of different methods and techniques to implement redacting portions of text transcriptions generated from inverse text normalization are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
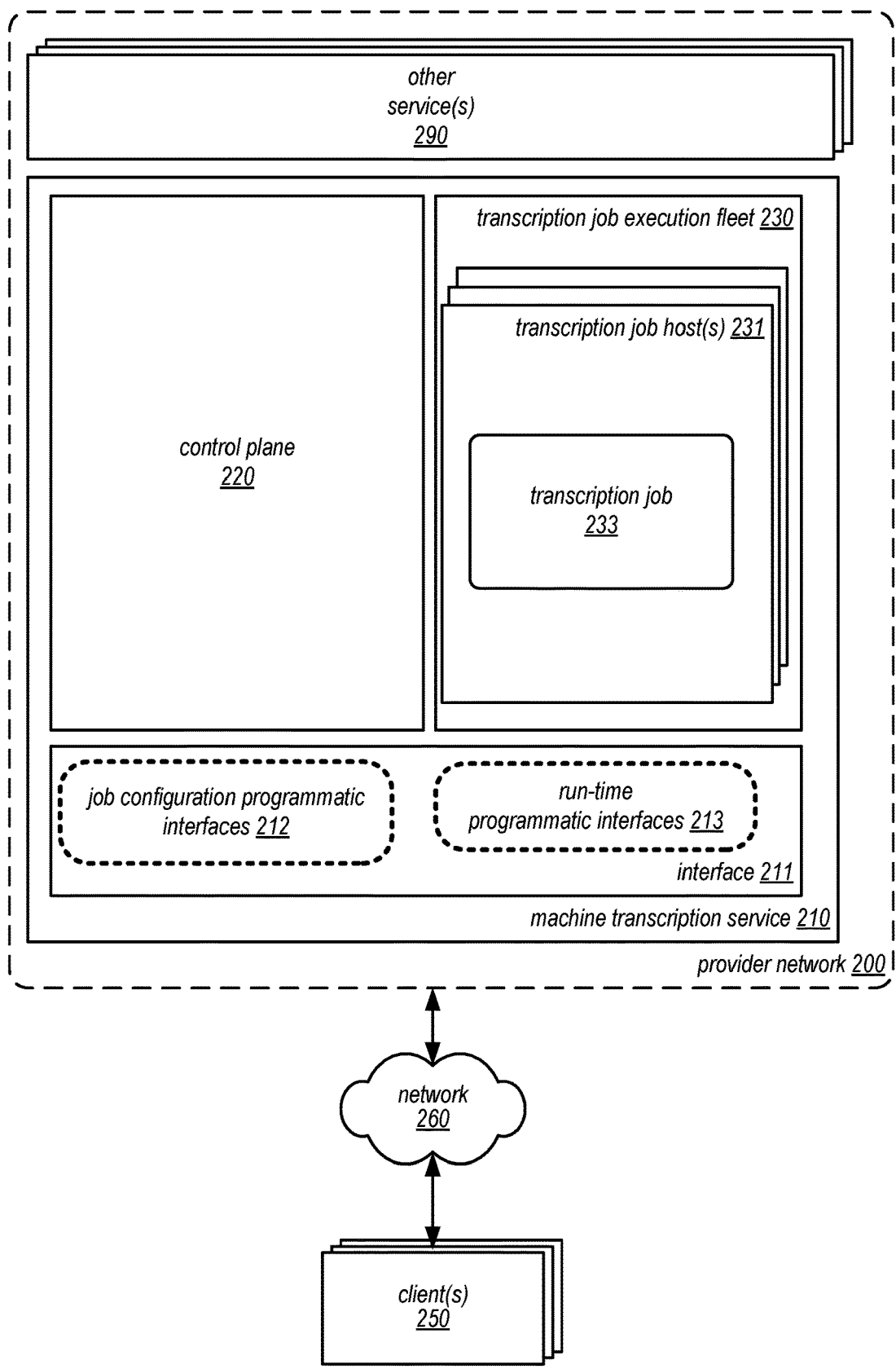
FIG. 2 illustrates an example provider network that may implement a text transcription service that implements redacting portions of text transcriptions generated from inverse text normalization, according to some embodiments.

FIG. 2 illustrates an example provider network that may implement a text transcription service that implements redacting portions of text transcriptions generated from inverse text normalization, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as machine transcription service 210, and/or any other type of network-based services 290 (which may include a virtual compute service and various other types of storage, database or data processing, analysis, communication, event handling, visualization, data cataloging, data ingestion (e.g., ETL), and security services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane 220 for machine transcription service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine transcription service 210 may be implemented by a particular node or may be distributed across several nodes. In some embodiments, a given node may implement the functionality of more than one service system component (e.g., more than one data store component).

Machine transcription service 210 may implement interface 211 to allow clients (e.g., client(s) 250 or clients implemented internally within provider network 200, such as a client application hosted on another provider network service like an event driven code execution service or virtual compute service) to interact with dialog driven application management service. Interface 211 may be one or more a graphical user interfaces, programmatic interfaces that implements Application Program Interfaces (APIs) and/or a command line interfaces).

In some embodiments, interface 211 may be broadly classified into job configuration programmatic interfaces 212 and run-time programmatic interfaces 213 (which may be directed to control plane 220 and transcription job execution fleet 230 respectively). The job programmatic interfaces 212 may be used by application owners and developers to create and provide preferred configuration settings for transcription jobs which are to be executed using the transcription job execution fleet 230, as discussed below with regard to FIG. 3, in various embodiments. Users may interact with the machine transcription service 210 via the interfaces 212 from a variety of application owner devices (e.g., on clients 250) in different embodiments, such as desktop computers, laptops, mobile devices and the like. Data sources or destinations for machine transcription jobs may interact with the transcription job host(s) 231 performing a transcription job 233 via run-time programmatic interfaces 213 in the depicted embodiment Machine transcription service 210 may implement a control plane 220 to perform various control operations to implement the features of machine transcription service 210. For example, control plane 220 may monitor the health and performance of requests at different components (e.g., of transcription job host(s) 231). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments.

In various embodiments, machine transcription service 210 may implement transcription job execution fleet 230 to host or otherwise implement transcription jobs 233 specified as discussed in detail below with regard to FIG. 3.

Generally speaking, clients 250 may encompass any type of client that can submit network-based requests to provider network 200 via network 260, including requests for machine transcription service 210 (e.g., a request to develop a dialog driven application or a run-time request to establish a dialog communication). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of machine transcription service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like machine transcription service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
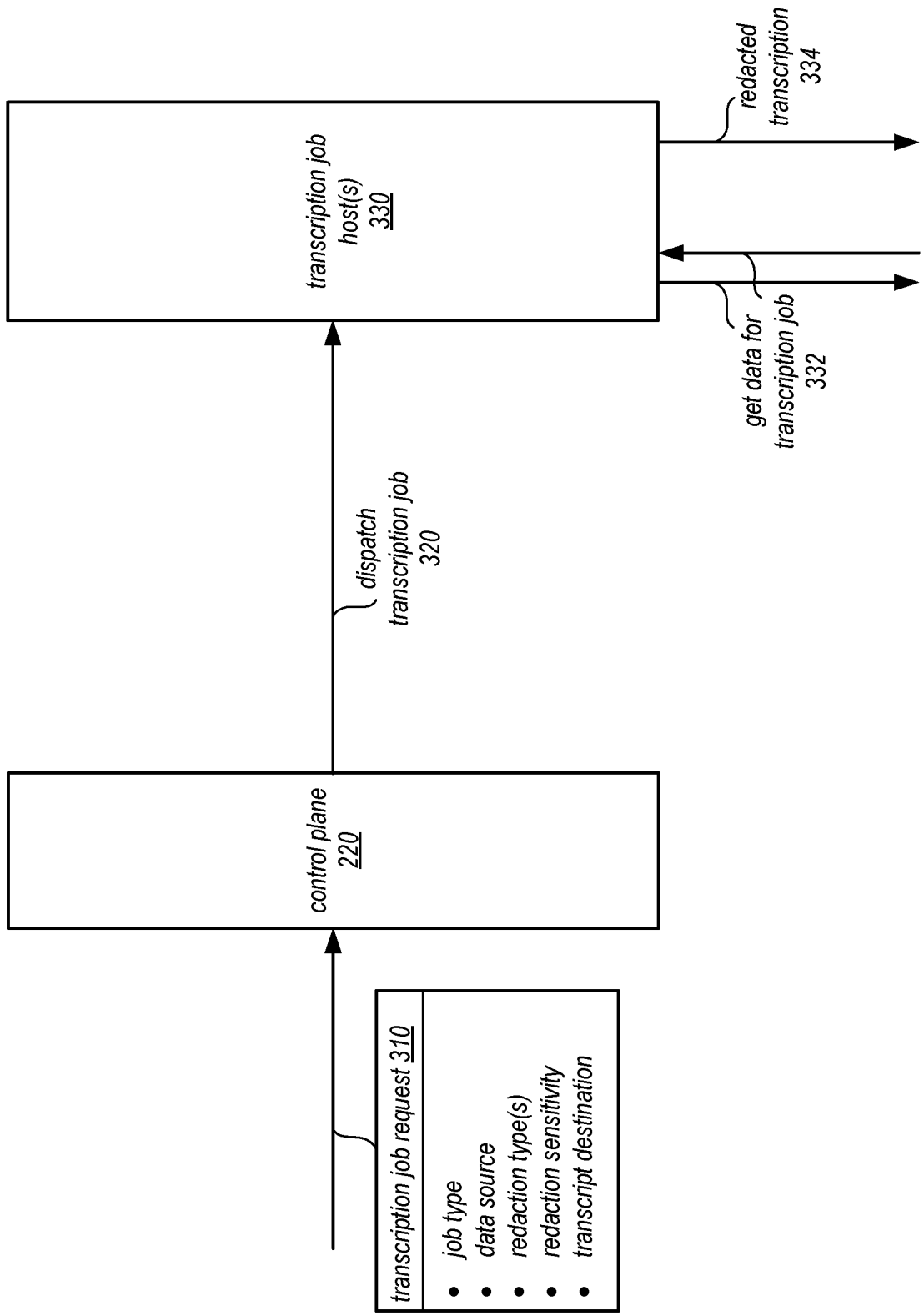
FIG. 3 illustrates a logical block diagram of interactions with a text transcription service to perform redactions on transcribed text, according to some embodiments.

FIG. 3 illustrates a logical block diagram of interactions with a text transcription service to perform redactions on transcribed text, according to some embodiments. A transcription job request 310 may be submitted to control plane 220 for handling. Transcription job request 310 may specify various features of the transcription job, such as job type, like batch transcription discussed below with regard to FIG. 4 or streaming transcription discussed below with regard to FIG. 5. Data source may be specified to identify which systems, storage locations, access credentials, and/or other information and setup (e.g., registering to receive data) may be used to perform the transcription job. Redaction type(s) may be a selection of one or more supported redaction classes (e.g., mapping to different types of financial, personal, security, or other information to be redacted). In some embodiments, a custom redaction type can be specified (e.g., along with providing a classifier for that redaction type). In some embodiments, the transaction job request may allow for redaction sensitivity to be specified, which may affect the application or levels of confidence thresholds for determining whether to apply redaction to text data.

Control plane 220 may dispatch the transcription job 320 to transcription job host(s) 330, in some embodiments. Transcription host(s) 330, similar to hosts discussed above with regard to FIG. 2, may perform the transcription job, including operations to get data for the transcription job, as indicated at 332, and provide the redacted transcription 334 to a specified destination in request 310 (e.g., to another service for further processing and/or to a storage system).

Figure 4:
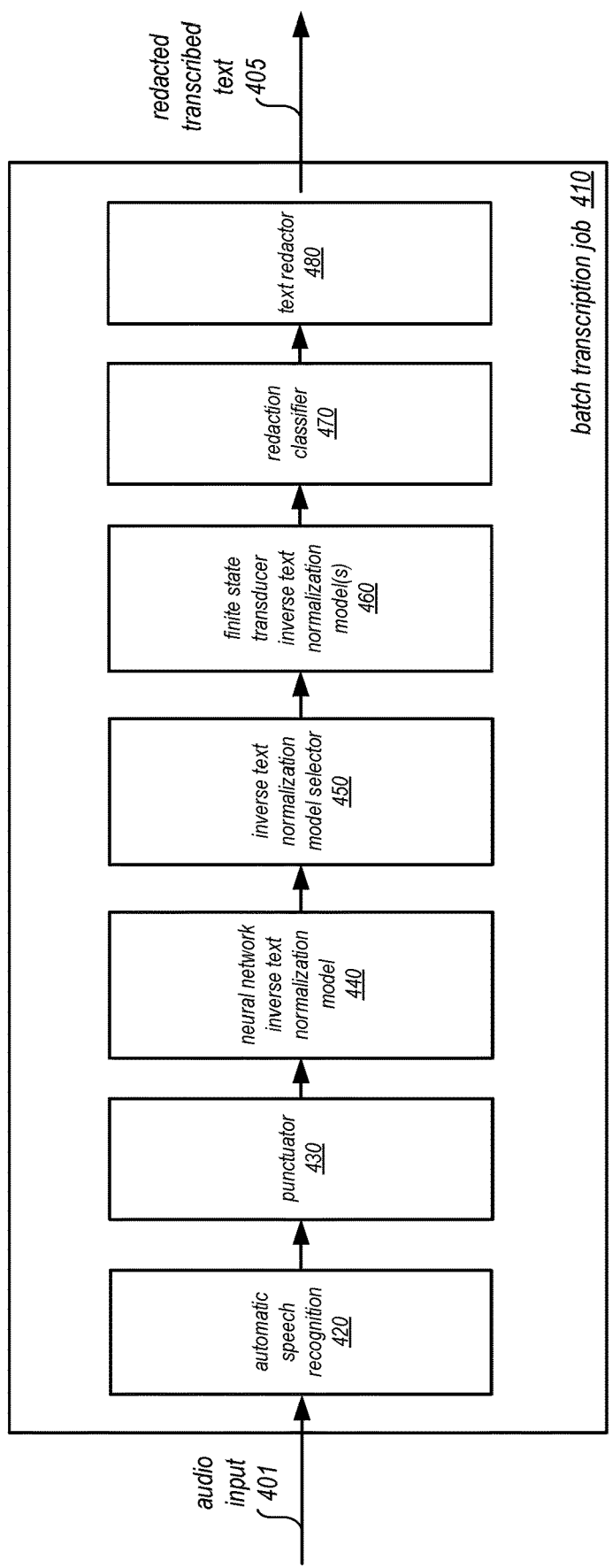
FIG. 4 illustrates a logical block diagram of batch-based text transcription that performs redaction, according to some embodiments.

As discussed above with regard to FIG. 3, different types of transcription jobs may be performed by machine transcription service 210. FIG. 4 illustrates a logical block diagram of batch-based text transcription that performs redaction, according to some embodiments. Batch transcription job 410 may operate of on audio input 401 which may be obtained from a stored file (or collection of files), which may be accessed as part of batch transcription job. Automatic speech recognition 420 may be implemented in various embodiments. Automatic speech recognition 420 may be implemented using one or more machine learning models trained to determine from form slices or portions of audio input data (e.g., a Convolutional Neural Network (CNN) and/or a Recurrent Neural Network) sentence, word, and/or character predictions based on the input audio data. Text data may be provided as the output of automatic speech recognition 420.

Punctuator 430 may accept the text output of automatic speech recognition 420 and using FSTs, or other rules based techniques, or trained machine learning models, punctuation information to be added to the text data (e.g., periods, commas, question marks, quotation marks, exclamation marks, number-related punctuation, such as dollar signs, decimals, etc.). The output of punctuator 430 may be provided to neural network inverse text normalization model 440.

As discussed in detail below with regard to FIG. 6, in some embodiments, neural network inverse text normalization model 440 may implemented to make a prediction for the input text as a sequence-to-sequence problem where the source and target are spoken and written form of text respectively. In some embodiments, content-based additive attention may be implemented to align the output sequence with input. In some embodiments, the neural network-based inverse text normalization model may be a transformer based sequence to sequence model, where multi-head self-attention layers are used in an encoder and a decoder. In these embodiments, the source and target sentences may be segmented into sub word sequences.

In some embodiments, for a sequence-to-sequence model used to implement a neural network-based text transformation machine learning model, the transformer based sequence-to-sequence model may be implemented by utilizing a copying mechanism that uses a generation probability to choose between source sentence vocabulary and a fixed target vocabulary. In some embodiments, a pre-trained neural network-based machine learning model can be used and then fine-tuned. In some embodiments, context aware embeddings may be extracted and fused into each layer of a transformer encoder and decoder via an attention mechanism.

The normalized text provided by neural network inverse text normalization model 440 may be provided along with a corresponding confidence score or value associated with the predicted normalization of the text provided by the model 440. Inverse text normalization model selection 450 may apply threshold or other criteria based on the confidence score to determine whether to use the predicted normalized text (for scenarios where the predicted normalized text satisfies the criteria) or provide the punctuated text from punctuator 430 to finite state transducer inverse text normalization model(s) (for scenarios where the predicted normalized text does not satisfy the criteria), in some embodiments.

As discussed in detail below with regard to FIG. 6, a finite state transducer (FST) inverse text normalization model 460 may describe different states, where each state in the FST performs a series of edits to the input string to get its corresponding written format output string. In various embodiments, FST models covers a wide range of use cases which do not require contextual understanding or disambiguation such as: Cardinals, Fractions, Ordinals, Years, Floats, Date, Time, Currency, Units and Measurements for inverse text normalization.

The normalized text data from FST at 460 may be provided to redaction classifier 470, in various embodiments. Redaction classifier 470 may classify different text portions for redaction based on a specified or select set of redactions for batch transcription job 410, as discussed above with regard to FIG. 3. Redaction classifier 470 may be one of various types of classification machine learning models that may be trained to classify input text as belonging to a class corresponding to content to be redacted (e.g., trained to classify PII, profanity, or other text (including numerical characters or non-letter characters)). The output of redaction classifier 470 may be text portions (e.g., word (s)), class labels, and confidence scores.

Text redactor 480 may apply redaction according to the classifications and confidence scores. For example, a label indicating the redaction (and/or the classification of the redacted data (e.g., "PII", "profanity", etc.) may be included. In some embodiments, the label may be a character string or symbols (e.g., "**"). In some embodiments, a confidence score or other threshold for applying redaction may be used to determine if redaction should actually be applied for a predicted class (e.g., so that low confidence classifications are not redacted). In some embodiments, this criteria may be related to or determined from a sensitivity level (e.g., the confidence thresholds) to apply for text redaction specified as part of batch transcription job 410, as discussed above with regard to FIG. 3**.

In some embodiments, a separate text capitalizer may apply one or more rules-based techniques or models (e.g., FSTs) to determine which characters in the normalized and redacted (if any) text should be capitalized after redaction classifier 470. However, this feature, as well as other features like punctuator 430 may be implemented in different orders or within other stages (e.g., performed as part of neural network inverse text normalization model 440 or finite state transducer inverse text normalization model(s) 460). This redacted transcribed text may then be provided, as indicated at 405.

Figure 5:
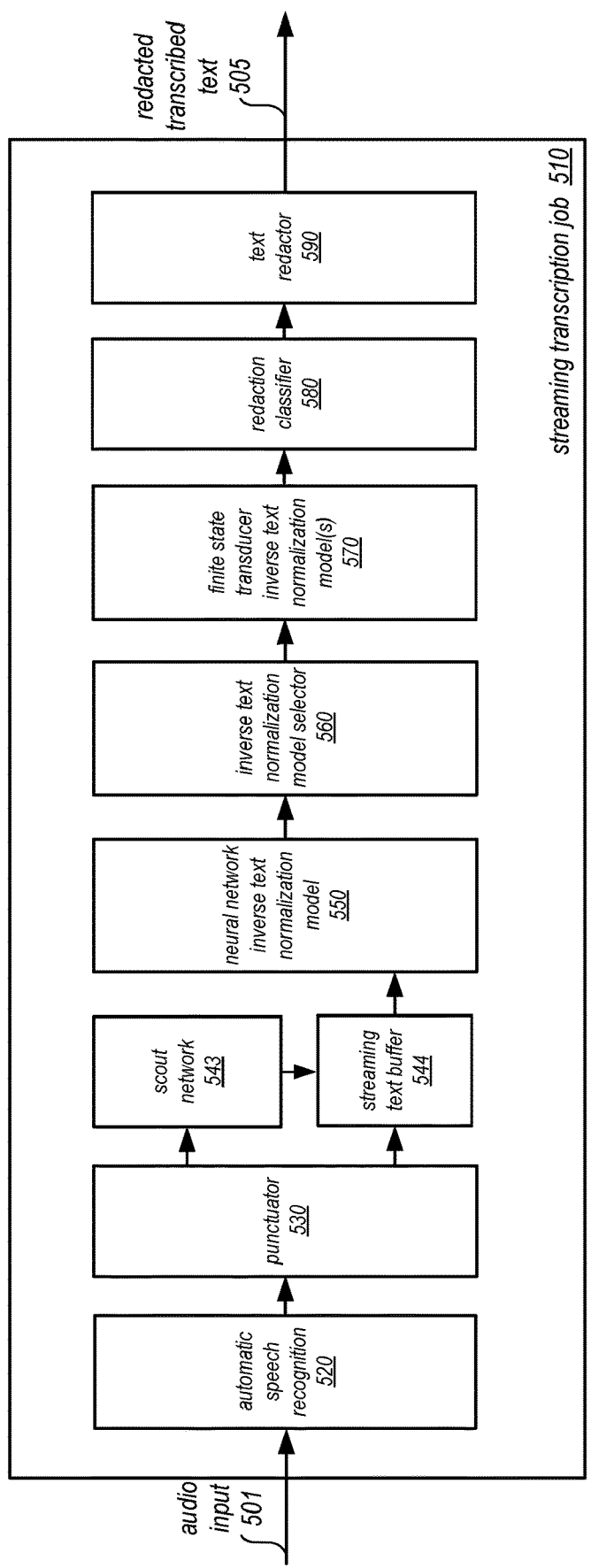
FIG. 5 illustrates a logical block diagram of streaming-based text transcription that performs redaction, according to some embodiments.

FIG. 5 illustrates a logical block diagram of streaming-based text transcription that performs redaction, according to some embodiments. Similar to batch transcription job 410 discussed above with regard to FIG. 4, a streaming transcription job 510 may be performed. Streaming transcription job 510 may operate of on audio input 501 which may be obtained from a stored file (or collection of files), which may be accessed as part of batch transcription job. Automatic speech recognition 520 may be implemented in various embodiments. Automatic speech recognition 520 may be implemented using one or more machine learning models trained to determine from form slices or portions of audio input data (e.g., a Convolutional Neural Network (CNN) and/or a Recurrent Neural Network) sentence, word, and/or character predictions based on the input audio data. Text data may be provided as the output of automatic speech recognition 520.

Punctuator 530 may accept the text output of automatic speech recognition 520 and using FSTs, or other rules based techniques, or trained machine learning models, punctuation information to be added to the text data (e.g., periods, commas, question marks, quotation marks, exclamation marks, number-related punctuation, such as dollar signs, decimals, etc.). The output of punctuator 530 may be provided to scout network 543 and streaming text buffer 544.

In various embodiments, scout network 543 may determine how much context (e.g., the number of words) that should be included in the later stages, inverse text normalizations 550 and 560, and redaction 580 and 590, in order to make an accurate redaction decision. Scout network 543 may be a trained machine learning model that detects context boundaries between one or more words. In some embodiments, scout network 543 may be trained as a sequence labeling problem that predicts when a boundary for context occurs. In this way, the number of words to consider for normalization and redaction may be predicted and provided from streaming text buffer 544, instead of performing normalization and making redaction decisions on possibly incomplete data. Once scout network 543 has determined the number of words, the number of words are provided from streaming text buffer 544 to inverse text normalization model 550.

As discussed in detail below with regard to FIG. 6, in some embodiments, neural network inverse text normalization model 550 may implemented to make a prediction for the input text as a sequence-to-sequence problem where the source and target are spoken and written form of text respectively. In some embodiments, content-based additive attention may be implemented to align the output sequence with input. In some embodiments, the neural network-based text normalization model may be a transformer based sequence to sequence model, where multi-head self-attention layers are used in an encoder and a decoder. In these embodiments, the source and target sentences may be segmented into sub word sequences.

In some embodiments, for a sequence-to-sequence model used to implement a neural network-based text transformation machine learning model, the transformer based sequence-to-sequence model may be implemented by utilizing a copying mechanism that uses a generation probability to choose between source sentence vocabulary and a fixed target vocabulary. In some embodiments, a pre-trained neural network-based machine learning model can be used and then fine-tuned. In some embodiments, context aware embeddings may be extracted and fused into each layer of a transformer encoder and decoder via an attention mechanism.

The normalized text provided by neural network inverse text normalization model 550 may be provided along with a corresponding confidence score or value associated with the predicted normalization of the text provided by the model 540. Inverse text normalization model selection 560 may apply threshold or other criteria based on the confidence score to determine whether to use the predicted normalized text (for scenarios where the predicted normalized text satisfies the criteria) or provide the punctuated text from punctuator 530 to finite state transducer inverse text normalization model(s) (for scenarios where the predicted normalized text does not satisfy the criteria), in some embodiments.

As discussed in detail below with regard to FIG. 6, a finite state transducer (FST) inverse text normalization model 570 may describe different states, where each state in the FST performs a series of edits to the input string to get its corresponding written format output string. In various embodiments, FST models covers a wide range of use cases which do not require contextual understanding or disambiguation such as: Cardinals, Fractions, Ordinals, Years, Floats, Date, Time, Currency, Units and Measurements for inverse text normalization.

The normalized text data from FST at 570 may be provided to redaction classifier 580, in various embodiments. Redaction classifier 580 may classify different text portions for redaction based on a specified or select set of redactions for streaming transcription job 510, as discussed above with regard to FIG. 3. Redaction classifier 580 may be one of various types of classification machine learning models that may be trained to classify input text as belonging to a class corresponding to content to be redacted (e.g., trained to classify PII, profanity, or other text (including numerical characters or non-letter characters)). The output of redaction classifier 580 may be text portions (e.g., word (s)), class labels, and confidence scores.

Text redactor 590 may apply redaction according to the classifications and confidence scores. For example, a label indicating the redaction (and/or the classification of the redacted data (e.g., "PII", "profanity", etc.) may be included. In some embodiments, the label may be a character string or symbols (e.g., "****"). In some embodiments, a confidence score or other threshold for applying redaction may be used to determine if redaction should actually be applied for a predicted class (e.g., so that low confidence classifications are not redacted). In some embodiments, this criteria may be related to or determined from a sensitivity level (e.g., the confidence thresholds) to apply for text redaction specified as part of batch transcription job 510, as discussed above with regard to FIG. 3.

In some embodiments, a separate text capitalizer (not illustrated) may apply one or more rules-based techniques or models (e.g., FSTs) to determine which characters in the normalized and redacted (if any) text should be capitalized after redaction classifier. However, this feature, as well as other features like punctuator 530 may be implemented in different orders or within other stages (e.g., performed as part of neural network inverse text normalization model 550 or finite state transducer inverse text normalization model(s) 570). This redacted transcribed text may then be provided, as indicated at 505. For example, a streaming display of the transcript (including the redacted text) may be displayed, in some embodiments.

Although FIGS. 2-5 have been described and illustrated in the context of a provider network implementing a machine transcription service, the various components illustrated and described in FIGS. 2-5 may be easily applied to other systems that implement machine transcriptions systems or applications. As such, FIGS. 2-5 are not intended to be limiting as to other embodiments of redacting portions of text transcriptions generated from inverse text normalization.

Figure 6:
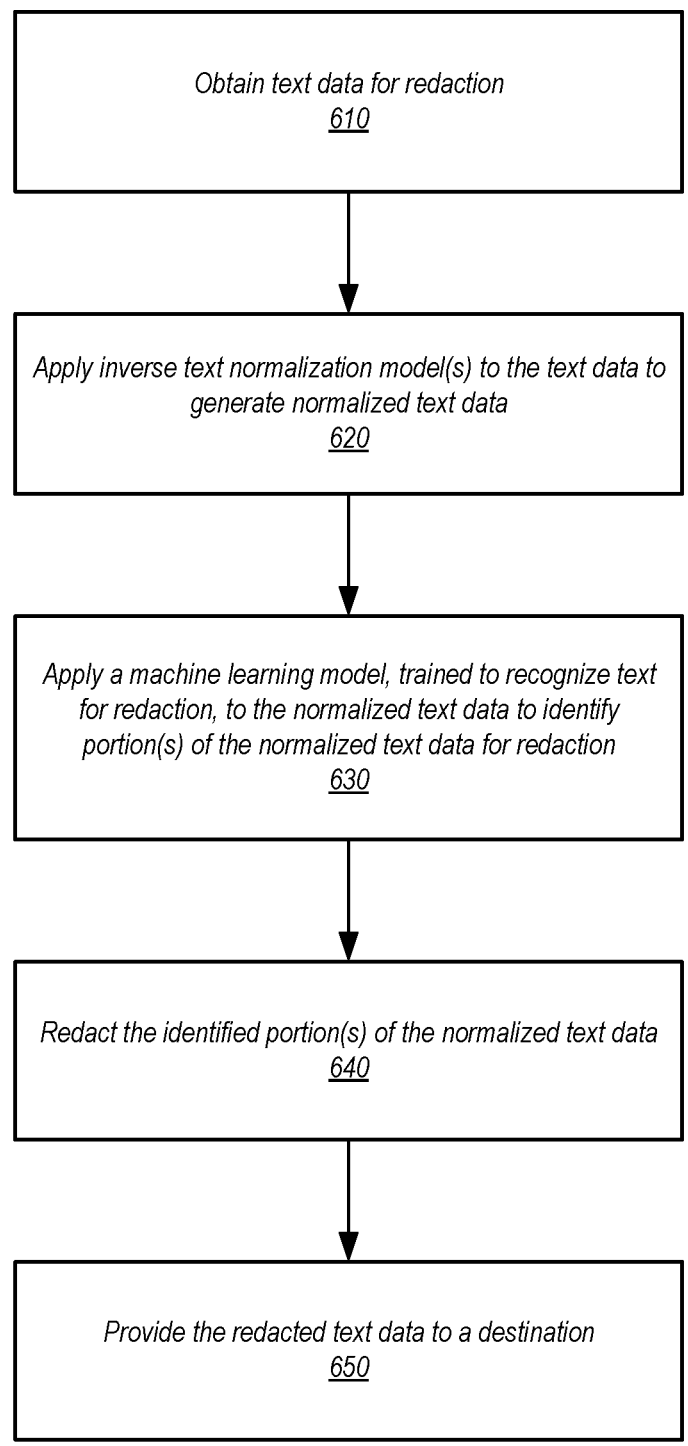
FIG. 6 illustrates a high-level flowchart of various methods and techniques to implement redacting portions of text transcriptions generated from inverse text normalization, according to some embodiments.

FIG. 6 illustrates a high-level flowchart of various methods and techniques to implement redacting portions of text transcriptions generated from inverse text normalization, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, text data may be obtained for redaction, in various embodiments. As discussed above with regard to FIGS. 1, 4 and 5, text data may be obtained for redaction from various sources. In some embodiments, text data may be obtained for a batch transcription job, where the text data may be obtained, initially, as a batch of audio data that is processed using an ASR model in order to generate text from the speech recognized in the audio data. This batch of text (e.g., multiple sentences, paragraphs, or other length of text data) may be stored in a storage system, in some embodiments, and then retrieved for further transcript processing, such as for inverse text normalization and redaction as discussed below. In another example embodiment, streaming audio data may be obtained and processed in streaming fashion for transcription. The text data may thus be obtained as a stream of text data where the entire set of text data to be transcribed may not yet be received or generated by automatic speech recognition.

As indicated at 620, one or more inverse text normalization model(s) may be applied to the text data to generate normalized text data, in various embodiments. For example, as discussed above with regard to FIGS. 1, 4 and 5, inverse text normalization models may include trained machine learning models, such as neural network-based inverse text normalization models. One example of such a trained neural network-based inverse text normalization model may perform inverse text normalization as a sequence-to-sequence problem where the source and target are spoken and written form of text respectively. In some embodiments, Bahdanau content-based additive attention may be implemented to align the output sequence with input. In some embodiments, the neural network-based inverse text normalization model may be a transformer based sequence to sequence model, where multi-head self-attention layers are used in an encoder and a decoder. In these embodiments, the source and target sentences may be segmented into sub word sequences.

In some embodiments, for a sequence-to-sequence model used to implement a neural network-based text transformation machine learning model, the transformer based sequence-to-sequence model may be implemented by utilizing a copying mechanism that uses a generation probability to choose between source sentence vocabulary and a fixed target vocabulary; thus allowing to generate out-of-vocabulary (OOV) words. The generation probability for each time-step may be computed from a context vector, transformer decoder self-attention output and the decoder input. In some embodiments, a pre-trained neural network-based machine learning model can be used and then fine-tuned. For example, a pre-trained Bayesian Additive Regression Trees (BART) model or a pre-trained Bidirectional Encoder Representations from Transformers (BERT) model may be used. In some embodiments, context aware embeddings may be extracted and fused into each layer of a transformer encoder and decoder via an attention mechanism.

In some embodiments, inverse text normalization models may include Finite State Transducers (FSTs). FSTs may be describe different states, where each state in the FST performs a series of edits to the input string to get its corresponding written format output string. In various embodiments, FST models covers a wide range of use cases which do not require contextual understanding or disambiguation such as: Cardinals, Fractions, Ordinals, Years, floats, Date, Time, Currency, Units and Measurements for inverse text normalization.

In some embodiments, a combination of inverse text normalization techniques may be implemented. For example, a neural network-based text inverse normalization model may be implemented to provide an initially normalized text. If the confidence for the initially normalized text exceeds a threshold amount, then an FST may be applied to correct any further normalization situations remaining in the initially normalized text. If there is not sufficient confidence, then the FST alone may be applied, in some embodiments.

As indicated at 630, a machine learning model may be applied that is trained to recognize text for redaction to the normalized text data to identify portions of the normalized text data for redaction, in some embodiments. For example, different classifications covering PII data, private or protected data, profanity or any many other words (or combinations) or other characters in the normalized text may be recognized using machine learning models that have been trained to generate a respective classification for the normalized text data. In some embodiments, redaction may be performed by considering the entire context (e.g., in batch processing scenarios where, for example, an entire sentence or paragraph is available). In streaming transcription job scenarios, as discussed above with regard to FIG. 5, a scout network (e.g., another trained machine learning model) may be implemented to predict the number of additional words (context) that may be needed before redaction classification can accurately classify text data for redaction.

As indicated at 640, the identifier portion(s) of the normalized text data may be redacted, in some embodiments. For example, a label indicating the redaction (and/or the classification of the redacted data (e.g., "PII", "profanity", etc.) may be included. In some embodiments, the label may be a character string or symbols (e.g., "**"). As indicated at 650, the redacted text data may be provided to a destination 650**. For example, the redacted text data may be stored as part of a transcript. In some embodiments, the redacted text data may be provided to other machine learning applications, or other systems, services, or applications, for further processing (e.g., sentiment analysis by machine learning applications or data extraction for ETL or other data processing).

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
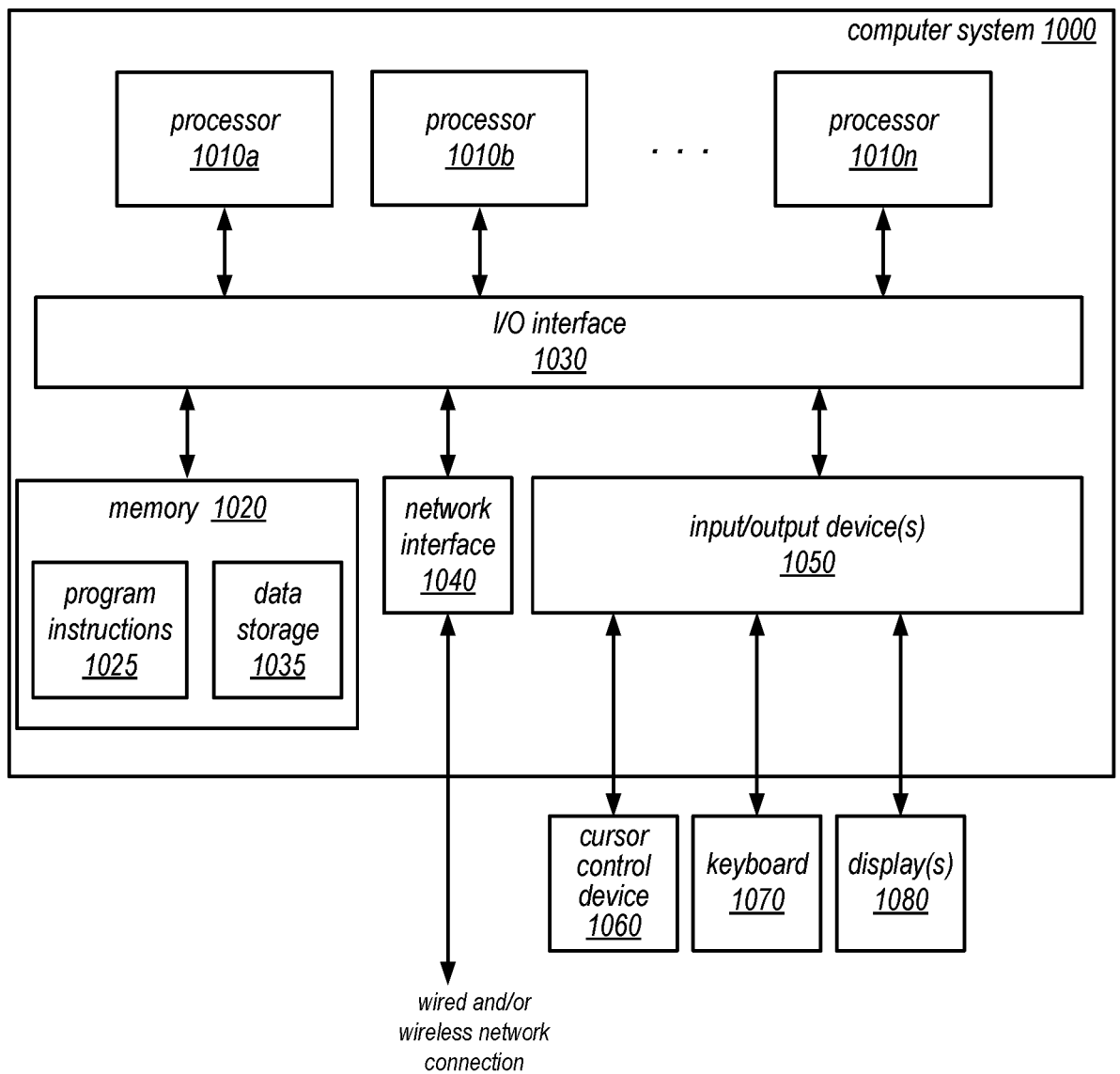
FIG. 7 illustrates an example system to implement the various methods, techniques, and systems described herein, according to some embodiments.

Embodiments of redacting portions of text transcriptions generated from inverse text normalization as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of dynamic entity catalog update for natural language processing, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a machine transcription system, configured to:
   obtain text data generated from one or more automated speech recognition techniques for redaction;
   cause application of a number of inverse text normalization models to the text data to generate normalized text data based, at least in part, on a predicted normalization by a first inverse text normalization model for the text data;
   cause application of a machine learning model, trained to recognize text for redaction, to identify one or more portions of the normalized text data for redaction;
   redact the identified one or more portions of the normalized text data; and
   provide the redacted text data to a destination.

2. The system of claim 1, wherein the text data is obtained to perform a batch transcription job and wherein the destination is a data storage system specified by the batch transcription job.

3. The system of claim 1, wherein the text data is a stream of text data for a streaming transcription job, and wherein the machine transcription system is further configured to apply a scout network to determine a number of words in the text data upon which to perform the application of the machine learning model to identify the one or more portions of the normalized text data for redaction.

4. The system of claim 1, wherein the machine transcription system is a machine transcription service offered by a provider network that performs a received transcription job request that includes the text data on behalf of a client of the provider network.

5. A method, comprising:
   obtaining, by a machine transcription system, text data for redaction;
   applying, by the machine transcription system, a number of inverse text normalization models to the text data to generate normalized text data based, at least in part, on a predicted normalization by a first inverse text normalization model for the text data;
   applying, by the machine transcription system, a machine learning model, trained to recognize text for redaction, to the normalized text data to identify one or more portions of the normalized text data for redaction;
   redacting, by the machine transcription system, the identified one or more portions of the normalized text data; and
   providing, by the machine transcription system, the redacted text data to a destination.

6. The method of claim 5, wherein the text data is obtained to perform a batch transaction job and wherein the destination is a data storage system specified by the batch transaction job.

7. The method of claim 5, wherein the text data is a stream of text data and wherein the method further comprises applying a scout network to determine a number of words in the text data upon which to perform the applying of the machine learning model to identify the one or more portions of the normalized text data for redaction.

8. The method of claim 5, wherein the application of the machine learning model is performed to evaluate the normalized text data for one or more redaction classifications specified in a request to the machine transcription system.

9. The method of claim 5, wherein the first inverse text normalization model is a neural network-based inverse text normalization model.

10. The method of claim 9, wherein applying the number of the one or more inverse text normalization models to the text data to generate normalized text data comprises:
    determining that a normalization confidence score for the predicted normalization of the text data satisfies confidence criteria; and
    responsive to the determination, applying a finite state transducer to the predicted normalization to produce the normalized text data.

11. The method of claim 5, wherein applying the number of the one or more inverse text normalization models to the text data to generate normalized text data comprises applying a finite state transducer to the predicted normalization to produce the normalized text data.

12. The method of claim 5, wherein the text data is obtained as the output of an automatic speech recognition system.

13. The method of claim 5, wherein the applying of the machine learning model to the normalized text data to initially identifies a further one or more portions of the normalized text data for redaction and where the method further comprises not applying redaction to the further one or more portions of the normalized text data according to a determination that a confidence score for a classification for the further one or more portions is below a confidence threshold.

14. One or more non-transitory, computer-readable storage media, storing program instructions that when executed on or across one or more computing devices cause the one or more computing devices to implement:
    receiving text data for redaction;
    causing application of a number of one or more inverse text normalization models to generate normalized text data based, at least in part, on a predicted normalization by a first inverse text normalization model for the text data;
    causing application of a machine learning model, trained to recognize text for redaction, to the normalized text data to identify one or more portions of the normalized text data for redaction;
    redacting the identified one or more portions of the normalized text data; and
    providing the redacted text data to a destination.

15. The one or more non-transitory, computer-readable storage media of claim 14, wherein the text data is received as part of performing a batch transaction job and wherein the destination is a data storage system specified by the batch transaction job.

16. The one or more non-transitory, computer-readable storage media of claim 14, wherein the text data is a stream of text data and wherein the one or more non-transitory, computer-readable storage media store further program instructions that when executed on or across the one or more computing devices, cause the one or more computing devices to further implement applying a scout network to determine a number of words in the text data upon which to perform the applying of the machine learning model to identify the one or more portions of the normalized text data for redaction.

17. The one or more non-transitory, computer-readable storage media of claim 14, wherein the application of the machine learning model is performed to evaluate the normalized text data for one or more redaction classification specified in a received request.

18. The one or more non-transitory, computer-readable storage media of claim 14, wherein the first inverse text normalization model is a neural network-based inverse text normalization model.

19. The one or more non-transitory, computer-readable storage media of claim 18, wherein, in applying the number of the the one or more inverse text normalization models to the text data to generate normalized text data, the program instructions cause the one or more computing devices to implement:
    determining that a normalization confidence score for the predicted normalization of the text data satisfies confidence criteria; and
    responsive to the determination, applying a finite state transducer to the predicted normalization to produce the normalized text data.

20. The one or more non-transitory, computer-readable storage media of claim 14, wherein the one or more computing devices are implemented as part of a machine transcription service offered by a provider network.

* * * * *